United States Patent [19]

Kolbusz et al.

[11] Patent Number: 5,000,067
[45] Date of Patent: Mar. 19, 1991

[54] LOCK FOR TRAILER HITCH

[76] Inventors: Richard A. Kolbusz, 832 Northampton Dr., Crystal Lake, Ill. 60014; Jon F. Huizinga, 1919 Hillside Trail, Cary, Ill. 60013

[21] Appl. No.: 477,516

[22] Filed: Feb. 9, 1990

[51] Int. Cl.⁵ .............................................. B25B 13/48
[52] U.S. Cl. ........................................ 81/436; 70/258; 280/507
[58] Field of Search .......................... 81/436; 70/258; 280/507, 511, 514

[56] References Cited

U.S. PATENT DOCUMENTS

| | | | |
|---|---|---|---|
| 3,391,555 | 7/1968 | Mamo | 70/258 |
| 3,884,055 | 5/1975 | Vuillemot | 280/507 X |
| 4,480,513 | 11/1984 | McCauley et al. | 81/436 |
| 4,542,914 | 9/1985 | Shropshire | 280/507 |
| 4,571,964 | 2/1986 | Bratzler | 70/258 X |
| 4,686,874 | 8/1987 | McCauley et al. | 81/436 X |
| 4,711,106 | 12/1987 | Johnson | 70/34 |
| 4,730,841 | 3/1988 | Ponder | 280/507 |

*Primary Examiner*—James G. Smith
*Attorney, Agent, or Firm*—Mathew R. P. Perrone, Jr.

[57] ABSTRACT

For a two-piece trailer hitch, a secure locking device is formed with a U-shaped member and a compatible bar for the U-shaped member. The U-shaped member has a female threaded end and female locking end. The bar has a male threaded end and a female key receiving end. A holding pin may provide additional strength for holding the bar in the U-shaped member. A key removes the bar from or attaches the bar to the U-shaped member.

17 Claims, 4 Drawing Sheets

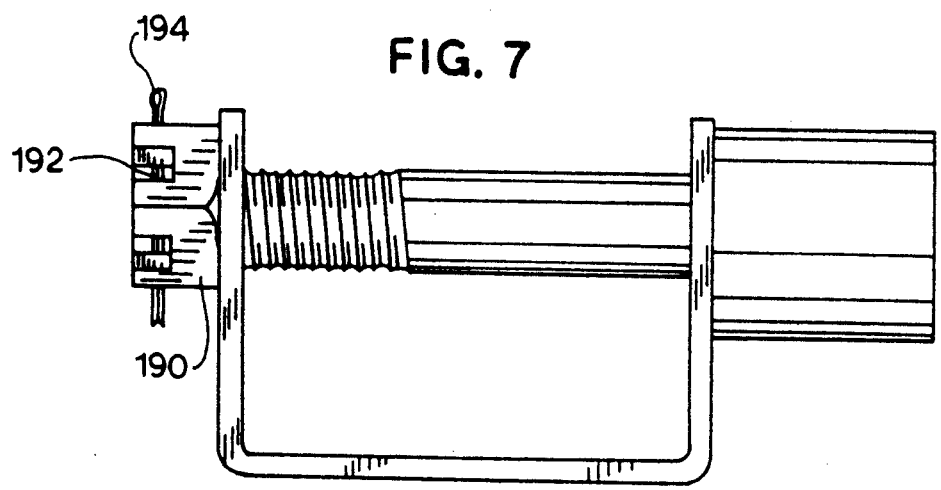
FIG. 7
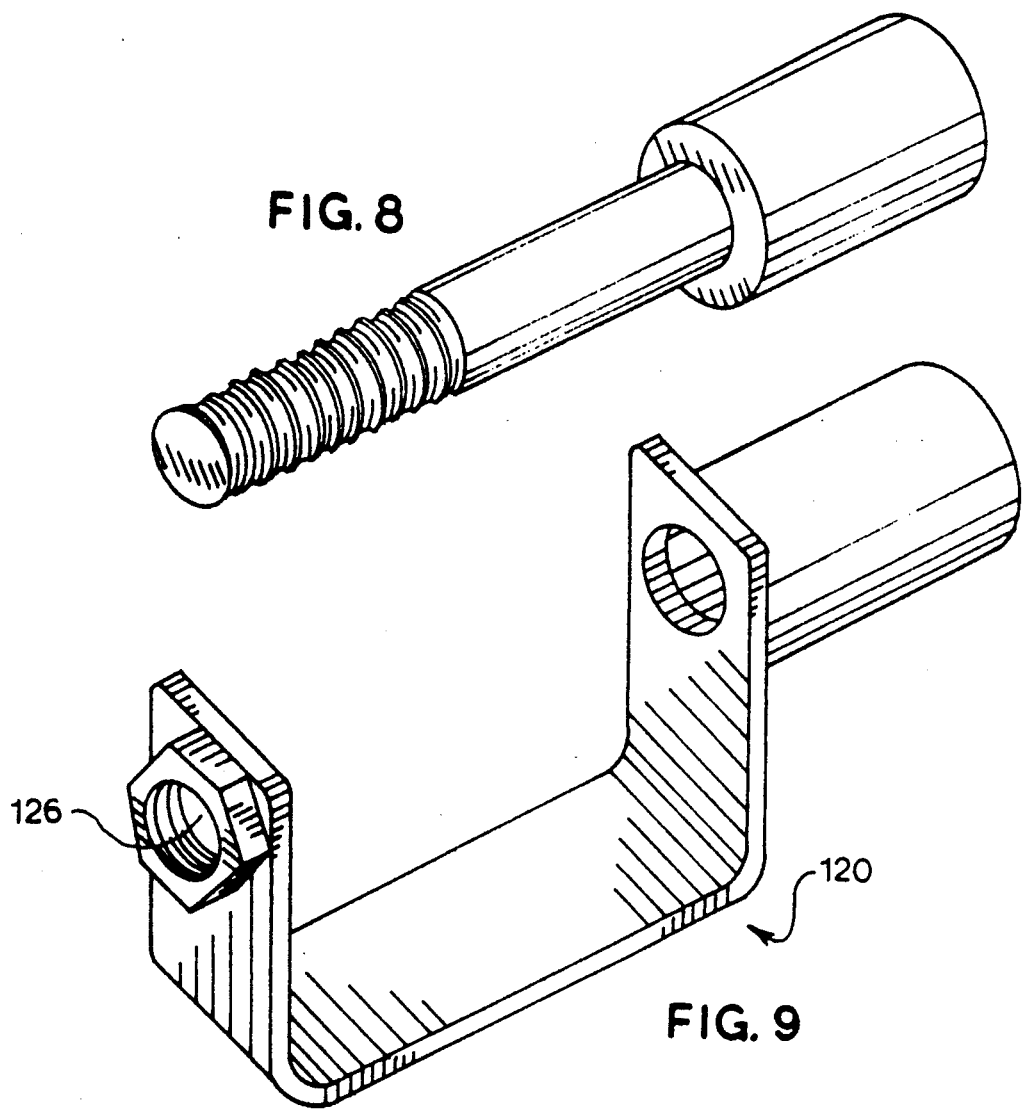
FIG. 8
FIG. 9

LOCK FOR TRAILER HITCH

The invention relates to a lock for a trailer hitch and more particularly to a compact, secure locking device for a trailer hitch.

BACKGROUND OF THE INVENTION

Well known in the art of trailer hitches is the two piece trailer hitch With the two piece trailer hitch, a vehicle member is mounted on the vehicle and does not protrude beyond the bumper of the vehicle. In order to make this trailer hitch effective, a removable member is slidably mounted within the first vehicle member and held therein by a pin. In this manner, a vehicle can have trailer towing capability added or removed as desired. This factor protects the trailer hitch from undesired weather wear.

This trailer hitch removability factor also improves the aesthetic appearance of a vehicle. While a trailer hitch is utilitarian, the presence of the hitch without a trailer detracts from the aesthetic appearance of a vehicle. The two-piece trailer hitch thus provides both a utilitarian and aesthetic function.

While this structure provides for a convenient method and apparatus for providing the joinder of the two-piece trailer hitch or the separation of the two-piece trailer hitch, many problems are presented. It becomes very easy to duplicate the vehicle member of that two piece trailer hitch and provide for a simple method of stealing the trailer and the item thereon by simply removing the cotterpin and separating the removable member of the trailer hitch from the vehicle member In this fashion, the removable member of trailer hitch can be easily mounted in a similar device of the vehicle member mounted on a thief's vehicle. Then the trailer is towed away together with whatever is on the trailer.

This problem is well recognized in the art, because a number of locking devices have been provided to avoid this problem. However, these locking devices have a tendency to be cumbersome and bulky, and not easily operated. It is highly desirable to provide a simple locking mechanism which is easily operable while at the same time strong enough to provide protection.

A threaded locking device is useful for solving some of the protection problems, but not strong enough to provide all of the desired protection. These devices can also be bulky and cumbersome. Additionally, the pressure of towing can release the threaded locking device. If the strength and simplicity of the threaded locking device can be achieved, while avoiding an undesired release of the locking device when in use, great advantages are obtained in trailer security.

SUMMARY OF THE INVENTION

Therefore, it is an objective of this invention to provide a secure locking device for a two-piece, trailer hitch.

A further objective of this invention is to provide a sturdy U-shaped member as a part of a secure locking device for a two-piece, trailer hitch.

Yet a further objective of this invention is to provide a theft prevention device for a two-piece trailer hitch.

Also an objective of this invention is to provide a theft prevention device for a two-piece trailer hitch, which has a simplified operation mode.

Another objective of this invention is to provide a theft prevention device for a two-piece trailer hitch, which has improved strength.

Still another objective of this invention is to provide a theft prevention device for a two-piece trailer hitch, which has improved resistance to breakage.

Yet another objective of this invention is to provide a unique key for secure locking device for a two-piece, trailer hitch.

A further objective of this invention is to provide a secure locking device for a two-piece, trailer hitch to improve the safety of the trailer hitch.

Yet a further objective of this invention is to provide a two-piece trailer hitch for aesthetic vehicle appearance, while maintaining the utilitarian function of a two-piece trailer hitch.

These and other objectives of this invention including, but not limited to securing a two-piece trailer hitch, are met by providing a secure locking device having a U-shaped member and a compatible bar for the U-shaped member. The U-shaped member has a female threaded end and female locking end. The bar has a male threaded end and a female key receiving end. A holding pin may provide additional strength for holding the bar in the U-shaped member. A key removes the bar from or attaches the bar to the U-shaped member and the two-piece trailer hitch as desired.

BRIEF OF THE DRAWINGS

FIG. 7 depicts a perspective view of FIG. 1, showing a pin 194 modification holding castle nut 190.

FIG. 8 depicts a perspective view of the bar 170 of this invention.

FIG. 9 depicts a perspective view of the U-shaped housing 120 of this invention.

Throughout the Figures of drawings where the same part appears in more than one Figure of the drawings, the same numeral is applied thereto.

DESCRIPTION OF THE PREFERRED EMBODIMENTS

The locking of the trailer hitch is accomplished by having a U-shaped housing as a first member of the secure locking device for a two-piece trailer hitch with a bar as the second member of the secure locking device. The bar closes the U-shaped housing. The bar furthermore is threaded at one end to go into threaded relation with the one end side of the U-shaped housing while at the same time there is a unique key mechanism on the other end of the bar for applying or removing the bar. Thus, with the uniquely-shaped key, a simplified method of achieving the bar results can be found.

Figure 2:
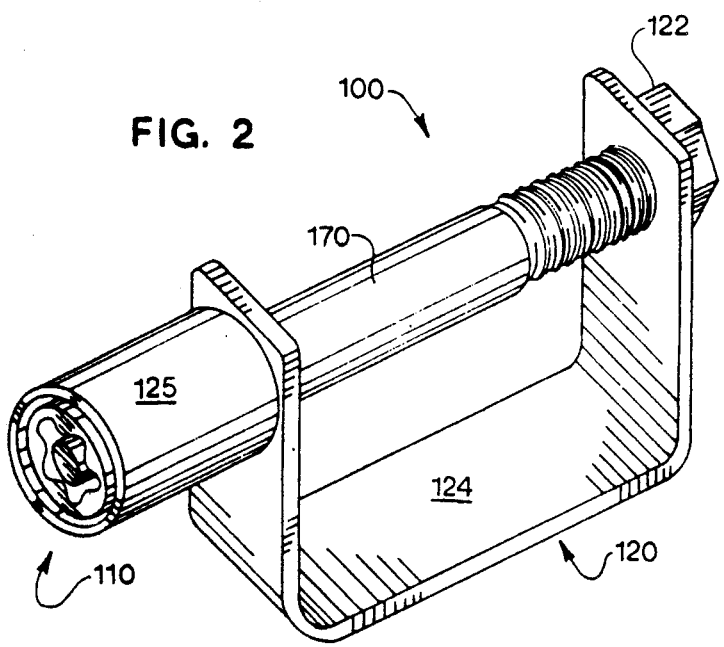
FIG. 2 depicts a reverse perspective view of FIG. 1, showing the locking end 110.
Figure 1:
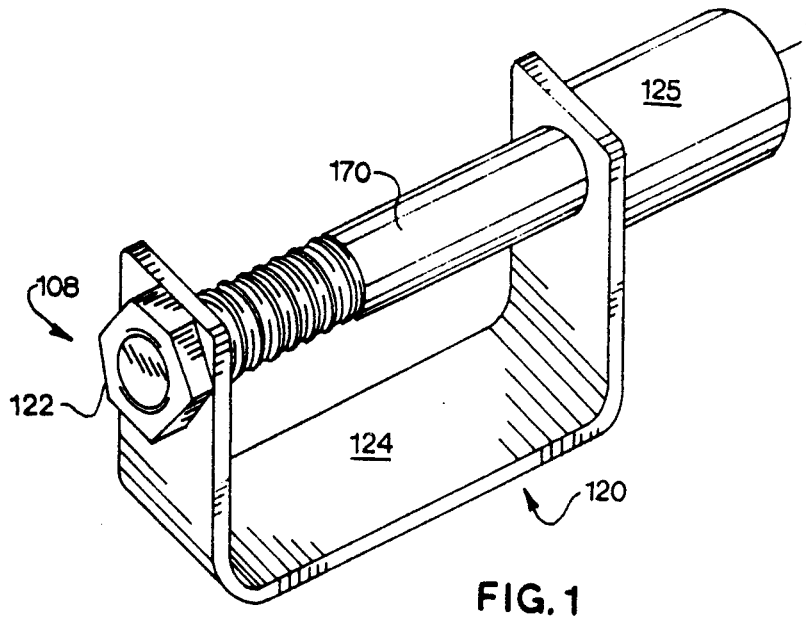
FIG. 1 depicts a perspective view of the secure locking device 100 of this invention from the threaded end 108.

Referring now to FIG. 1 and FIG. 2, the secure locking device 100 is depicted The secure locking device 100 has a U-shaped housing 120 and a bar 170 removably closing the U-shaped housing 120. At one end of the U-shaped housing 120 is a threaded receiving end 122.

At the opposing end of the U-shaped housing 120 is a key cylinder 125. The threaded receiving end 122 is threaded on the interior thereof. Thus, the threaded receiving end 122 and the end containing key cylinder 125 are both substantially perpendicular to U-shaped housing base 124. Further, key cylinder 125 is cylindrical and has a concentric axis with the threaded receiving end 122.

To form the threaded receiving end 122, a nut aperture 126 (shown in FIG. 9) can be formed in threaded receiving end 122 in a standard fashion. Then a standard nut 128 can be welded or otherwise secured to threaded receiving end 122 concentric with nut aperture 126. As shown in FIG. 7, castle nut 190 can be used to provide for a pin 194.

Referring now to FIG. 3, FIG. 4, FIG. 5, FIG. 8, and FIG. 9, bar 170 is shown as having bar threads 172 at one end thereof and a bar key receiver 174 at the other end thereof. Bar threads 172 fit into threaded receiving end 122 and mesh therewith. The bar key receiver 174 fits into key cylinder 124 so that the bar key receiver 174 is thoroughly inside the key cylinder 124 and cannot be reached by a wrench or other unauthorized removing device.

Figure 10:
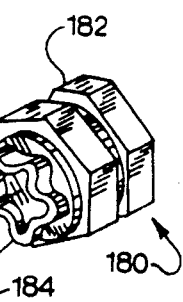
FIG. 10 depicts a perspective view of the key 180 of this invention.
Figure 5:
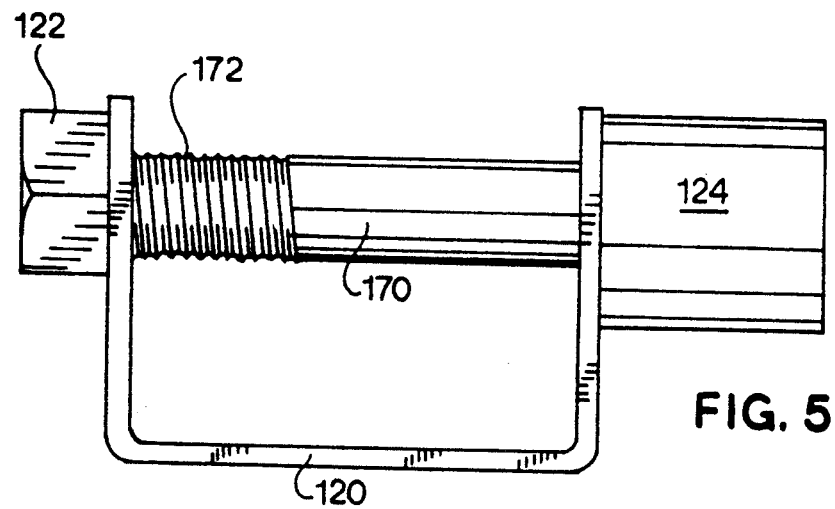
FIG. 5 depicts a side view of FIG 1.
Figure 3:
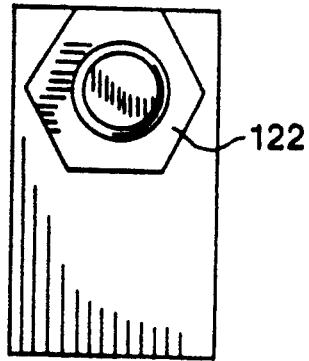
FIG. 3 depicts an end view of FIG. 1.
Figure 4:
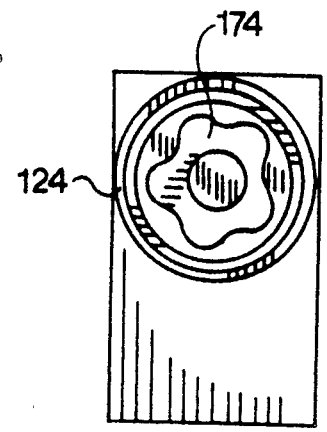
FIG. 4 depicts an end view of FIG. 2.

Considering now FIG. 4, FIG. 5, and FIG. 10, the bar key receiver 174 is shaped so that only key 180 fits onto or into bar key receiver 174. Thus key 180 may fit on bar key receiver 174 and may be used to rotate the bar threads 172 into and out of threaded receiving end 122 as bar 170 passes with bar threads 172 through key cylinder 124 to threaded receiving end 122. In this manner, the bar 170 may be moved into or out of U-shaped housing 120.

Figure 6:
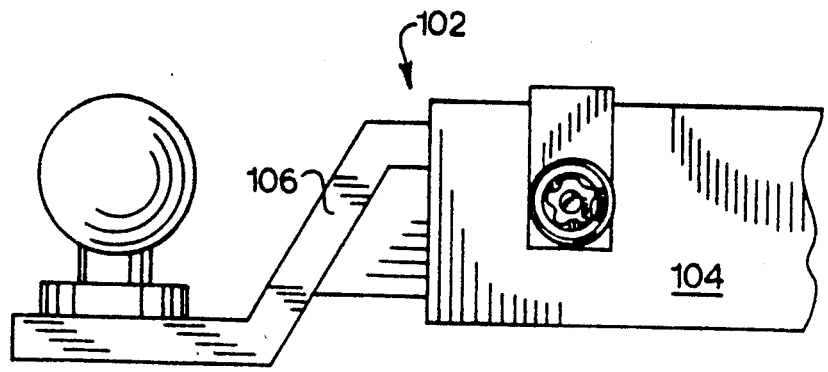
FIG. 6 depicts the secure locking device 100 of this invention in combination with the desired trailer hitch 102.

The function of secure locking device 100 becomes clear when considering FIG. 6. A two-piece trailer hitch 102 has a vehicle member 104 secured to a vehicle (not shown) and a trailer member 106 mounted thereto. A thick bar pin (not shown) holds vehicle member 104 and trailer member 106 secured together through apertures therein. Bar 170 replaces the thick bar pin, while U-shaped housing 120 serves to lock bar 170 in two-piece trailer hitch 102.

Referring now to FIG. 7, it is possible to modify the secure locking device 100 with pin 194. Pin 194 is inserted through pin housing aperture 190 and cotter pin bar aperture 192 in bar threads 172. Rotation of bar 170 is permitted to align these devices. With pin 194 in place, rotation of the bar is when the secure locking device 100 is in use is not permitted. Pin 194 can be a cotter pin, a hitch pin or a similar device. Thus, the trailer hitch 102 cannot separate.

As shown in FIG. 10, the key 180 has a standard handle 182 at one end thereof and a key receiving member 184 at the other end thereof. Standard handle 182 may shaped in any suitable fashion. For example, handle 182 may be a nut to receive a socket wrench (as shown). Handle 182 may be hand turnable, too.

The key receiving member 184 fits onto bar key receiver 174 of bar 170 in a female-male relationship, and into key cylinder 124 in male-female relationship. Thus, the key 180 fits inside of key cylinder 124 and bar key receiver 174 — for either inserting bar 170 into U-shaped housing 120 and trailer hitch 102 or removing bar 170 from U-shaped housing 120 and trailer hitch 102 as desired.

Figure 11:
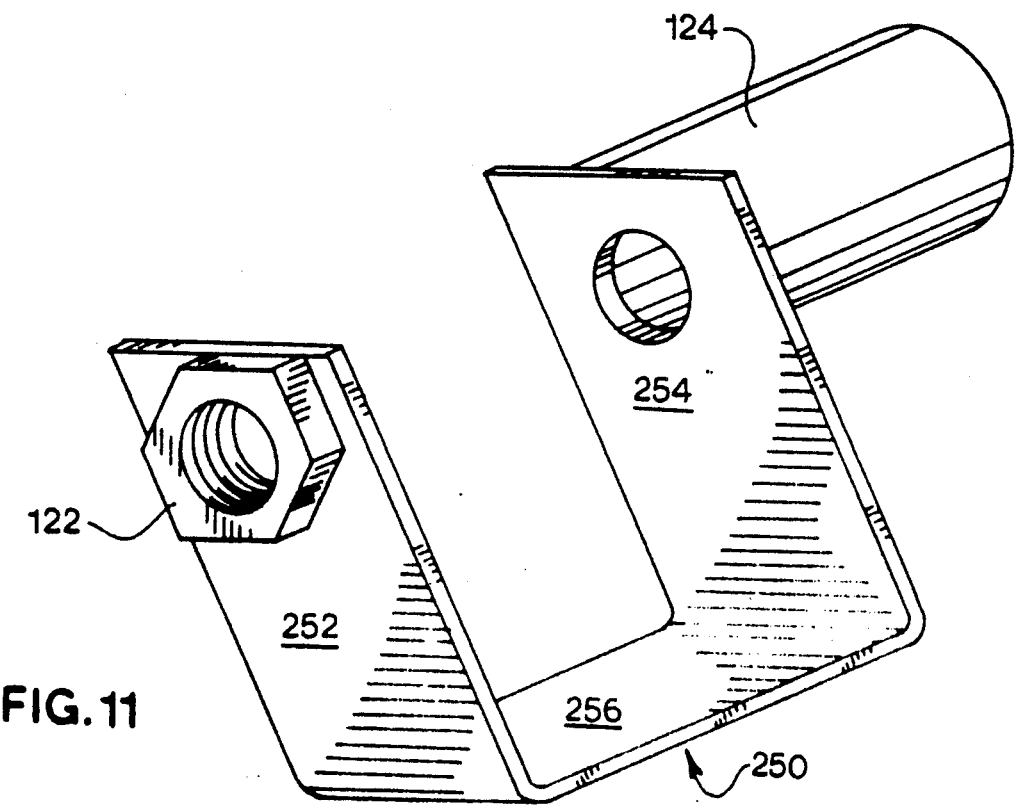
FIG. 11 depicts a perspective view of the angled housing 250 of this invention.
Figure 12:
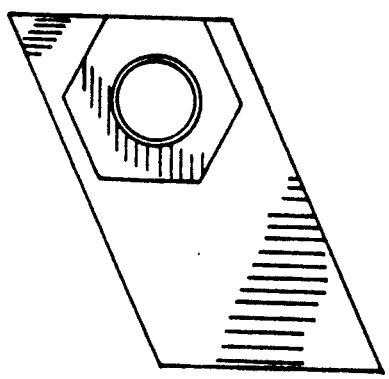
FIG. 12 depicts an end view of FIG. 11.
Figure 13:
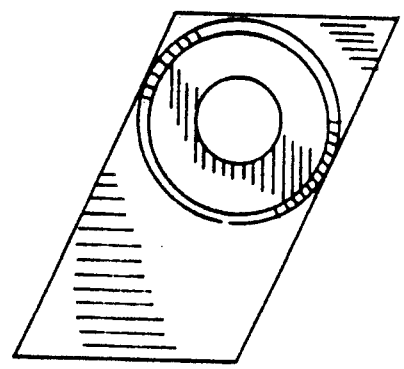
FIG. 13 depicts a reverse end view of FIG. 12.

FIG. 11 depicts a variation of secure locking device 100 by a variation in U-shaped housing 120. As is seen from FIG. 1, a plane perpendicular to the parallel threaded end 108 and locking end 110 is perpendicular to a plane containing U-shaped housing base 124.

In FIG. 11, an angled housing 250 is depicted. With angled housing 250, a plane perpendicular to both the angled threaded member 252 and angled key member 254 is not perpendicular to a plane containing angled housing base 256. Angled housing 250 can be made to fit any two-piece trailer 102.

Both U-shaped housing 120 and angled housing 250 serve to secure bar 170 in trailer hitch 102. Access to bar 170 is restricted to a person having the desired key 180. Thus, the differences in the two depicted locking devices 100, the only difference is in U-shaped housing 120 and angled housing 250.

Thus both a two piece hitch of the Reese type or the Draw-tite type can be protected with secure locking device 100 — as can other two-piece hitches. Major effort is required to bypass the secure locking device 100 and steal the trailer. Such a delay can be sufficient to discourage most thieves. This is accomplished in a simple fashion with great efficiency.

The secure locking device 100 may be made of any suitable material having the tensile strength and other requirements to handle the work involved. While it is clear that the secure locking device 100 can be made of metal, it is also possible to use synthetic resins or appropriate plastics. Customarily, the U-shaped housing 120 is flattened piece of material, with the threaded receiving end 122 and key cylinder 125 molded therein, secured by welding, or otherwise secured to the U-shaped housing 120.

This application — taken as a whole with the specification, claims, and abstract, — provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modifications of this method and apparatus can become clear to a person having ordinary skill in this particular art. Such modifications are clearly covered by this disclosure.

What is claimed and sought to be protected by letters Patent of the United States is:

1. A secure locking device in combination with a two-piece trailer hitch for replacing a pin used to hold said two-piece trailer hitch, said secure locking device including a bar and a U-shaped housing, wherein:
    a. said bar extends between ends of said U-shaped housing and replaces said pin;
    b. said bar has a threaded inserting end at a first end thereof and a key mechanism at a second end thereof;
    c. said U-shaped housing has a threaded receiving end at a first end thereof and a key cylinder at a second end thereof;
    d. said threaded receiving end has a concentric axis with said key cylinder;

e. said threaded receiving end is capable of receiving said threaded inserting end;
f. said key cylinder is capable of receiving said key mechanism;
g. said key mechanism is an integral part of said bar;
h. said two-piece trailer hitch includes a vehicle member and a removable member joined by said bar; and
i. said U-shaped housing is adapted to fit over said vehicle mounted member with said bar extending through aligned openings in said vehicle mounted member and said removable member.

2. The secure locking device of claim 1, wherein:
a. said threaded receiving end includes a nut aperture therein; and
b. said threaded receiving end further includes a nut secured to said threaded receiving end concentrically with said nut aperture.

3. The secure locking device of claim 2, wherein:
a. said nut is secured on an outside of said U-shaped housing;
b. said nut is a castle nut;
c. said bar has a bar aperture in said threaded inserting end; and
d. said bar aperture receives a pin to lock said castle nut in said threaded inserting end.

4. The secure locking device of claim 3, wherein:
a. said key cylinder completely receives said key mechanism; and
b. said key mechanism receives a special key.

5. The secure locking device of claim 4, wherein U-shaped member is composed of a sheet of material.

6. The secure locking device of claim 5, wherein said special key is hand operable.

7. The secure locking device of claim 5, wherein said special key is wrench operable.

8. The secure locking device of claim 5, wherein said U-shaped housing is a right angle housing.

9. A secure locking device in combination with a two-piece trailer hitch for replacing a pin used to hold said two-piece trailer hitch, said secure locking device including a bar and a U-shaped housing, wherein:
a. said bar closes said U-shaped housing and replaces said pin;
b. said bar has a threaded inserting end at a first end thereof and a key mechanism at a second end thereof;
c. said U-shaped housing has a threaded receiving end at a first end thereof and a key cylinder at a second end thereof;
d. said threaded receiving end has a concentric axis with said key cylinder;
e. said threaded receiving end is capable of receiving said threaded inserting end;
f. said key cylinder is capable of receiving said key mechanism;
g. said key mechanism is an integral part of said bar;
h. said U-shaped housing is an angled housing;
i. said two-piece trailer hitch includes a vehicle member and a removable member joined by said bar; and
j. said U-shaped housing is adapted to fit over said vehicle mounted member with said bar extending through aligned openings in said vehicle mounted member and said removable member.

10. The secure locking device of claim 9, wherein:
a. a first plane is defined by and contains a base of said angled housing;
b. a second plane is defined by being perpendicular to both an angled threaded member and an angled key member of said angled housing; and
c. said first plane and said second plane intersect at an acute angle with a supplemental angle being adjacent said acute angle.

11. The secure locking device of claim 10, wherein:
a. said threaded receiving end includes a nut aperture therein; and
b. said threaded receiving end further includes a nut secured to said threaded receiving end concentrically with said nut aperture.

12. The secure locking device of claim 11, wherein:
a. said nut is secured on an outside of said U-shaped housing;
b. said nut is a castle nut;
c. said bar has a bar aperture in said threaded inserting end; and
d. said bar aperture receives a pin to lock said castle nut in said threaded inserting end.

13. The secure locking device of claim 12, wherein
a. said key cylinder completely receives said key mechanism; and
b. said key mechanism receives a special key.

14. The secure locking device of claim 13, wherein U-shaped member is composed of a sheet of material.

15. The secure locking device of claim 14, wherein said special key is hand operable.

16. The secure locking device of claim 14, wherein said special key is wrench operable.

17. A method of combining a two-piece trailer hitch and secure locking device for securely locking said two-piece trailer hitch including replacing a pin used to hold said two-piece trailer hitch including a vehicle mounted member and a removable member joined by said pin, with said secure locking device, said secure locking device including a bar and a U-shaped housing, wherein:
a. said bar closes U-shaped housing and replaces said pin;
b. said bar has a threaded inserting end at a first end thereof and a key mechanism at a second end thereof;
c. said U-shaped housing has a threaded receiving end at a first end thereof and a key cylinder at a second end thereof;
d. said threaded receiving end has a concentric axis with said key cylinder;
e. said threaded receiving end is capable of receiving said threaded inserting end;
f. said key cylinder is capable of receiving said key mechanism; and
g. said key mechanism is an integral part of said bar; and further wherein said method includes:
h. aligning said threaded receiving end and said key cylinder of said U-shaped housing over aligned apertures in said two-piece trailer hitch;
i. inserting said threaded inserting end through said key cylinder, then through said aligned apertures in said two-piece trailer hitch then to said threaded receiving end; and
j. rotating said key mechanism to threadably interact said threaded receiving end and said threaded inserting end—in order to securely lock said vehicle mounted member and said removable member of said two-piece trailer hitch together.

* * * * *